July 8, 1941.     A. PLEINES     2,248,435

COMPRESSED AIR ACTUATED HYDRAULIC BRAKE

Filed June 17, 1939

Inventor
Adam Pleines

By Sommers & Young
Attorneys

Patented July 8, 1941

2,248,435

UNITED STATES PATENT OFFICE 2,248,435

COMPRESSED AIR ACTUATED HYDRAULIC BRAKE

Adam Pleines, Frankfort-on-the-Main, Germany, assignor to Alfred Teves Maschinen- und Armaturen Fabrik G. m. b. H., Frankfort-on-the-Main, Germany Application June 17, 1939, Serial No. 279,761
In Germany June 14, 1938

3 Claims. (Cl. 188—3)

This invention relates to combined compressed air-actuated hydraulic braking mechanism for vehicles, and particularly to brake-actuating mechanism of this kind especially suitable for actuating the brakes of combination vehicles, such as trucks with trailers or truck trains, in which auxiliary means for applying the brakes is provided on the trailer or the like being pulled by the motor vehicle proper. The invention relates particularly to the type of brake-actuating mechanism in which compressed air is the primary actuating fluid and is used for driving the piston of a compressed air motor which is operatively connected to directly drive the piston of a hydraulic brake master cylinder.

In such brake-actuating mechanism, particularly when intended for use with motor vehicles having trailers or trains, it is desirable to provide auxiliary brake-applying means adapted to be actuated from a position at a distance from the driver's station by another person, for instance a driver's assistant or helper, who is stationed on the trailer.

In order to avoid confusion, it should be understood that the present invention does not apply to entirely separate and independent braking systems which are oftentimes provided and required by local law. On the contrary, the present invention and disclosure relates to a single hydraulic braking power transmission system having at least two independent actuating means, one of which is preferably air pressure actuated and the other of which may be manually operated from a distance from the operated station of the compressed air-actuating means. This arrangement materially improves the safety of the braking system, as, in the event the compressed air-actuating means should become inoperative by reason of damage or any other reason, a supplemental or substitute brake-actuating means is available.

It is thus an object of this invention to provide a vehicle brake-applying system which is operable by a plurality of independent means which may be separated spatially.

A further object of this invention is to provide such a system with a locking brake-actuating means whereby the brakes may be mechanically held in applied condition.

A further feature of this invention is the provision of a second brake-applying piston in the hydraulic master cylinder operable in the opposite direction to the air-operated hydraulic piston in said cylinder, the second piston being operable manually by any known mechanical means, such as a hand lever, foot pedal, cable, winding operated by a pressure medium, or in any other desired manner. According to the present invention, the manually-actuated means applies brake-actuating pressure to the hydraulic power transmission fluid of the system and can be locked in brake-applying position if desired.

A further feature of the invention is the provision of rearward abutments for each of the oppositely-disposed pistons of the hydraulic braking power transmission system.

Another object of this invention is to provide a braking piston for applying pressure to the hydraulic medium with a limited resiliently yieldable means for compensating reduction of the volume of the hydraulic medium by temperature changes, leakage or the like, the said resilient means being, for instance, a spring interposed between the piston and its actuating means or rearward abutment.

The present invention is also applicable to the type of fluid pressure-actuated systems in which compressed air pressure is used for driving the actuating piston in releasing direction, the piston being provided with an elastic accumulator which may be in the form of a coil spring, which takes up the energy supplied by the compressed air and utilizes it for moving the piston in brake-applying direction when the opposing compressed air pressure is reduced sufficiently to be overcome by the spring pressure.

The accompanying drawing serving to illustrate the invention shows in Figure 1 a diagrammatic representation of the brake-operating system of a motor vehicle having a trailer.

Figure 1:
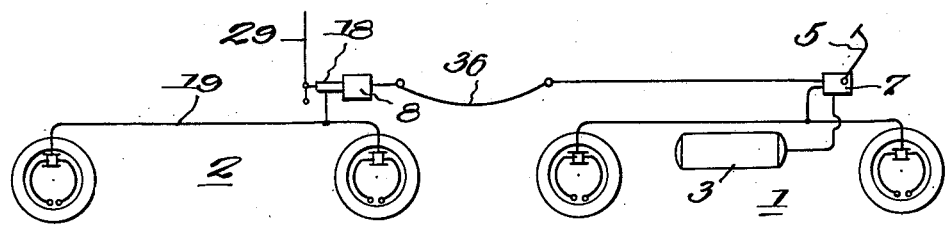
Figure 2:
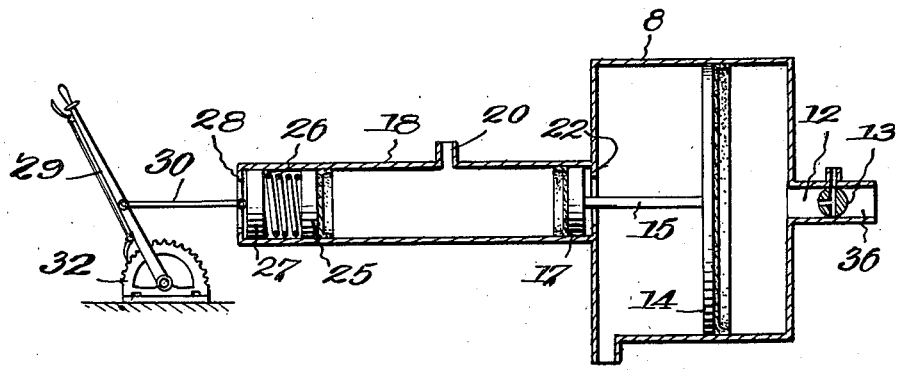
Fig. 2 is a cross-sectional view of a combined compressed air-brake-actuating motor and hydraulic master cylinder having additionally independent operating means and pressure-sustaining means.

The motor vehicle 1, represented in Fig. 1, is provided with a compressed air storage tank 3, and at the operator's station a brake-operating pedal 5 is provided. This pedal controls the supply of compressed air from tank 3 to or from a compressed air-operated motor 7. The motor may be of either the directly-driving type as illustrated in Fig. 2 or of the spring accumulator type illustrated in Fig. 3. The trailer 2 shown in Fig. 1 is provided with a brake-actuating motor 8 having in combination therewith an independently operable manual brake-applying means 29. The brakes of the trailer may thereby be applied independently of the compressed air supply and by a person located at a distance from the primary driver's position.

Fig. 2 shows a compressed air-actuated motor 8 having an air inlet 12 which may be controlled by a valve 13. A piston 14 has a rod 15 directly connected thereto and the rod is also directly connected to the hydraulic pressure-generating piston 17 in master cylinder 18, which cylinder may be directly joined to motor 8 by any means. The hydraulic braking power transmission system 19 of the vehicle or trailer is connected to cylinder 18 at 20. An abutment 22 is provided in the cylinder 18 to definitely limit the rearward movement of piston 17.

At the opposite end of cylinder 18 is provided a further piston 24 of special construction. This piston consists of two parts 25 and 27 with a spring 26 interposed therebetween. At the rear end of piston 27 the cylinder is provided with an abutment 28 to limit its rearward movement. A manual operating means which may take the form of a hand lever 29 connected to piston part 27 by link 30 is also provided. Operating lever 29 can be held in any adjusted position by any suitable means, such as ratchet 32. When the lever has been set in adjusted position by the ratchet, any variations of the volume of the hydraulic system due to temperature changes or minor leakage are taken up or compensated by the spring 26 which tends to maintain the pressure constant and thus prevents unintentional release of the brakes by pressure failure.

Figure 3:
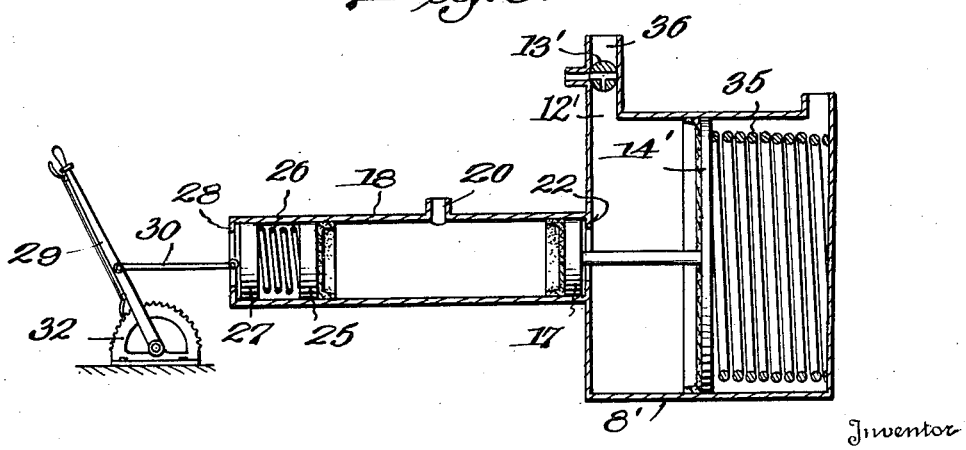
Fig. 3 is a view similar to Fig. 2 of a modified form of combined motor and master cylinder.

The modified embodiment of the invention shown in Fig. 3 is equipped with an accumulator spring type of motor 8' and the compressed air is admitted to and released from the motor from the opposite side of the piston 14' through inlet 12' and valve 13'. The direction of the action of the air is in brake-releasing direction. When air is released from the left-hand side of piston 14', the spring 35 forces piston 14' to the left and actuates hydraulic piston 17 to apply pressure to the hydraulic brake-actuating fluid in the hydraulic system.

It is to be understood that the air control valves 13 or 13' can be located at any desired point, for instance, at the station of the motor vehicle driver. The manually-operable brake-operating means, such as lever 29, can be located at a position spaced from the driver's station, for instance on the trailer, and can be operated by an assistant driver. The supply of compressed fluid from the driver's station to the motor on the trailer is conveyed through conduit 36, part of which is preferably flexible.

I claim:

1. Compressed fluid hydraulic brake-operating system for motor vehicles having trailers comprising a source of compressed air, a hydraulic fluid system on the trailer for transmitting braking effort to the trailer wheel brakes, a compressed fluid motor on said trailer, a hydraulic master cylinder on said trailer connected to said hydraulic fluid system and having a piston directly drivingly connected to said motor, means at the driver's station on the motor vehicle for controlling the supply of compressed air to the motor, the hydraulic master cylinder on the trailer having a second piston therein operative from the opposite direction from the first-mentioned piston for applying brake-operating pressure to the hydraulic fluid, and means manually operable from a position on the trailer for actuating said piston, the master cylinder having abutments in rear of each of said pistons to limit rearward movement of the respective pistons when the other one thereof is applying pressure to the hydraulic fluid.

2. Combined fluid pressure hydraulic brake-applying system for the brakes of vehicles comprising a compressed fluid motor, a hydraulic master cylinder having a piston operable by the motor in one direction, a second piston in said cylinder operable in the opposite direction to said first piston to apply pressure to the hydraulic medium, means for actuating said second piston manually, means for limiting the rearward movements of both of said pistons, means for locking said second piston in brake-applying position, said second piston comprising a pair of spaced discs and an intermediately disposed compression spring, said spring being compressed under the pressure applied to the pistons and serving to maintain uniform braking pressure and to compensate volume variations of the hydraulic fluid.

3. Combined fluid pressure hydraulic brake-applying system for the brakes of vehicles comprising a compressed fluid motor having an accumulator spring therein, a source of compressed fluid, means at the vehicle driver's station for controlling the supply and release of fluid to and from said motor, the compressed fluid moving the motor to compress the spring and release the vehicle brakes and the release of pressure allowing the spring to act to move the motor to apply the brakes, a hydraulic master cylinder having a piston operable by the motor in one direction, a second piston in said cylinder operable in the opposite direction to said first piston to apply pressure to the hydraulic medium, and means for actuating said second piston manually.

ADAM PLEINES.